United States Patent
Quigley et al.

(10) Patent No.: US 8,112,217 B2
(45) Date of Patent: Feb. 7, 2012

(54) EXHAUST BRAKES

(75) Inventors: David P. Quigley, Brighton, MI (US); Steven J. Andrasko, Wixom, MI (US)

(73) Assignee: GM Global Technology Operations LLC

( * ) Notice: Subject to any disclaimer, the term of this patent is extended or adjusted under 35 U.S.C. 154(b) by 399 days.

(21) Appl. No.: 12/503,945

(22) Filed: Jul. 16, 2009

(65) Prior Publication Data

US 2011/0011081 A1    Jan. 20, 2011

(51) Int. Cl.
 *F02D 9/06*    (2006.01)
(52) U.S. Cl. .......... 701/110; 701/108; 701/112; 123/323
(58) Field of Classification Search .......... 123/321–323, 123/568.11, 568.21; 60/600, 627; 701/108–110, 701/112
See application file for complete search history.

(56) References Cited

U.S. PATENT DOCUMENTS

| 6,553,958 | B1 * | 4/2003 | Kolmanovsky et al. ...... 123/295 |
| 7,715,975 | B2 * | 5/2010 | Yamaoka et al. .............. 701/103 |
| 2010/0185375 | A1 * | 7/2010 | Hanzawa et al. ............... 701/70 |

FOREIGN PATENT DOCUMENTS

JP        2007-92547    *    4/2007

* cited by examiner

*Primary Examiner* — Hai Huynh

(57) ABSTRACT

An exhaust brake control system includes a braking torque estimation module that estimates a desired braking torque based on engine speed. A volume flow rate determination module determines a desired volume flow rate of an exhaust gas based on the desired braking torque. An adjustment module adjusts an actual volume flow rate to control actual braking torque based on the desired braking torque and a change in exhaust temperature.

15 Claims, 3 Drawing Sheets

EXHAUST BRAKES

FIELD

The present disclosure relates to internal combustion engines, and more particularly to exhaust brakes for internal combustion engines.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

Exhaust brakes may be used for vehicle braking in diesel engines. When an exhaust brake is activated, an exhaust path downstream of an engine is closed or reduced to cause the exhaust gas to be compressed in the exhaust manifold to generate back pressure. With the increased back pressure in the exhaust manifold, load on the engine is increased, thereby slowing down the vehicle. The back pressure in the exhaust manifold and consequently the braking torque applied to the engine are generally proportional to an engine speed.

A variable geometry turbocharger (VGT) may regulate exhaust gas flow that passes through the VGT to control the back pressure in the exhaust manifold. Vanes of the VGT are generally set at a fixed position to accommodate a situation where the engine runs at a maximum speed. At the maximum engine speed, a maximum braking force is required for effective engine braking and the exhaust flow through the VGT is also at its maximum. The fixed flow passage defined by the VGT is larger than necessary to generate a desired back pressure at low engine speeds. As a result, the exhaust brake is less effective at lower engine speeds.

SUMMARY

Accordingly, an exhaust brake control system includes a braking torque estimation module that estimates a desired braking torque based on engine speed. A volume flow rate determination module determines a desired volume flow rate of an exhaust gas based on the desired braking torque. An adjustment module adjusts an actual volume flow rate to control actual braking torque based on the desired braking torque and a change in exhaust temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
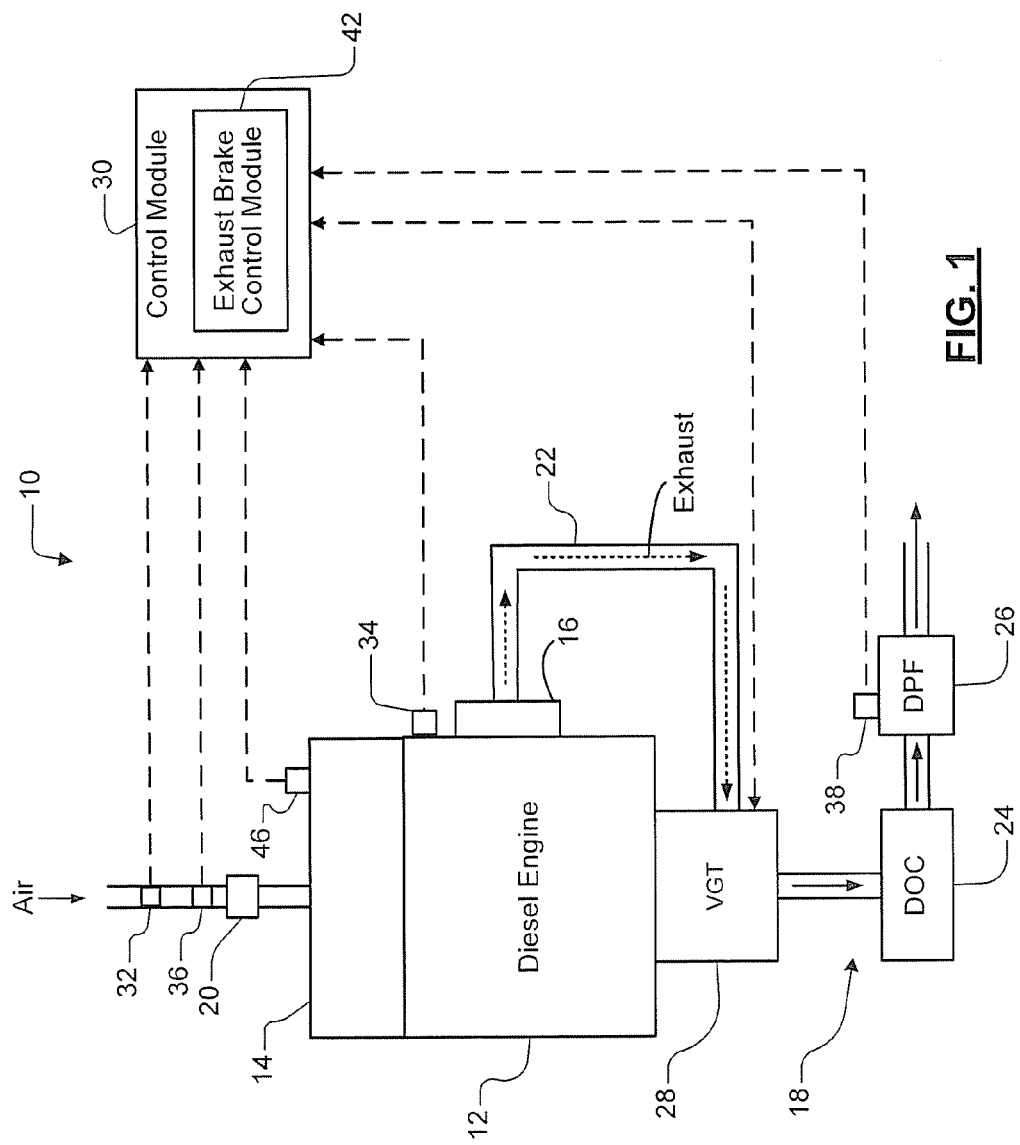
FIG. 1 is a block diagram of an engine system in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An exhaust brake control system in accordance with the teachings of the present disclosure determines an adjusted volume flow rate after a desired volume flow rate is decided based on a desired braking torque. The system makes an adjustment to the desired volume flow rate in response to a changed operating condition that results in an increased/decreased exhaust temperature. The system ensures that the actual braking torque matches the desired braking torque at the increased/decreased exhaust temperature by adjusting the desired volume flow rate.

Referring to FIG. 1, an engine system 10 includes a diesel engine 12, an intake manifold 14, an exhaust manifold 16 and an exhaust system 18 in communication with the exhaust manifold 16. Air is drawn through a throttle 20 into the intake manifold 14, which distributes air to the cylinders (not shown). Fuel is injected into cylinders by a common rail injection system (not shown) and the heat of the compressed air ignites the air/fuel mixture. The combustion of the air/fuel mixture generates combustion force to drive pistons (not shown) that rotatably drive a crankshaft (not shown). The exhaust gas exits from the cylinders, through the exhaust manifold 16, and into the exhaust system 18.

The exhaust system 18 includes an exhaust pipe 22, a diesel oxidation catalyst (DOC) 24, and a diesel particulate filter (DPF) 26. The DOC 24 removes particulate matter, hydrocarbon based soluble organic fraction, and carbon monoxides by oxidation. The DPF 26 is provided downstream of the DOC 24 to remove diesel particulate matter or soot from the exhaust gas.

A flow restriction device is provided in the exhaust system 18 and may be operated to restrict an exhaust flow in the exhaust pipe 22. When the exhaust flow is restricted, back pressure is built in the exhaust manifold 16 to apply a negative braking torque to the engine. The flow restriction device may include, for example only, a variable geometry turbocharger (VGT) 28 downstream of the exhaust pipe 22. The VGT 28 includes variable inlet guide vanes. The geometry of the VGT 28 may be changed by changing the position of the vanes, thereby changing the flow path and the volume flow rate of the exhaust gas that passes through the VGT 28.

A control module 30 communicates with a plurality of sensors that monitor engine operations and controls the engine operations accordingly. The plurality of sensors include, but are not limited to, an intake manifold absolute pressure (MAP) sensor 32, a mass air flow (MAF) sensor 34, an engine speed sensor 36, and a temperature sensor 38. The MAP sensor 32 generates a signal indicating the boost (the intake manifold pressure). The MAF sensor 34 generates a signal indicating the MAF into the intake manifold 14. The engine speed sensor 36 generates a signal indicating engine speed (RPM). The temperature sensor 38 is provided at the DPF 26 to measure the temperature of the exhaust gas.

Figure 2:
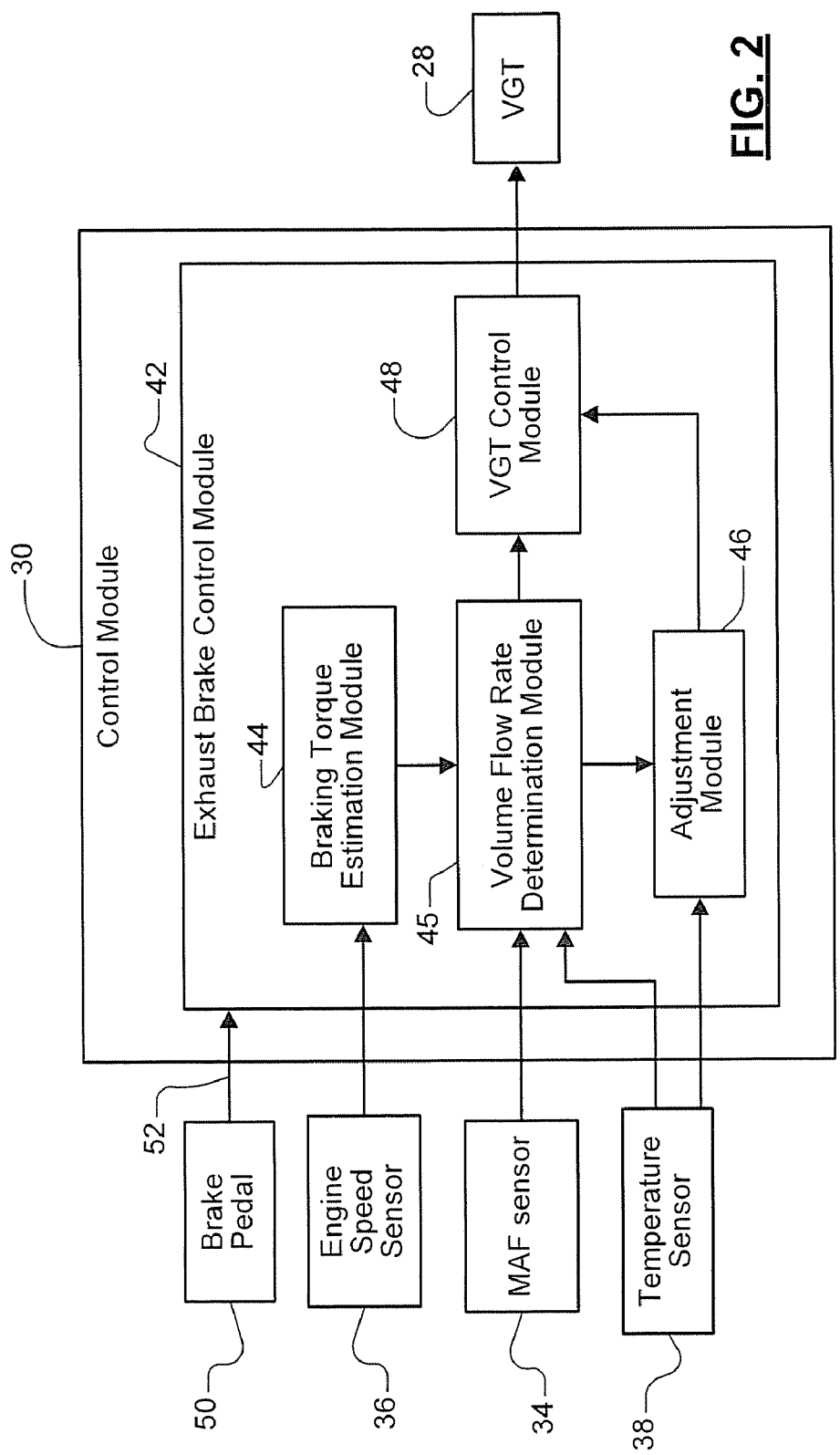
FIG. 2 is a block diagram of an engine control module in accordance with the teachings of the present disclosure.

Referring now to FIG. 2, the control module 30 includes an exhaust brake control module 42. The exhaust brake control module 42 estimates a desired braking torque to be applied to the engine 12 and controls the VGT 28 accordingly to achieve the desired braking torque.

The exhaust brake control module 42 includes a braking torque estimation module 44, a volume flow rate determination module 45, an adjustment module 46, and a VGT control module 48. The exhaust brake control module 42 may communicate with a brake pedal 50. The exhaust brake control module 42 may be activated, for example, when a brake request 52 is received based on depression of the brake pedal 50. Alternatively, the exhaust brake control module 42 may be activated based on vehicle conditions other than depression of the brake pedal 50. For example, the exhaust brake control module 42 may be activated when fueling request is not received, transmission torque converter is locked, wheel slip is not detected, and/or anti-lock braking system (ABS) is inactive.

The braking torque estimation module 44 communicates with the engine speed sensor 36 and estimates a desired braking torque based an engine speed and/or engine load. The "desired" or "estimated" braking torque refers to a torque that can achieve an effective engine braking at a particular engine speed and/or load. The desired (or estimated) braking torque varies with engine speeds.

The volume flow rate determination module 45 communicates with the braking torque estimation module 44, the MAF sensor 34, and the temperature sensor 38 and determines a desired volume flow rate that corresponds to the desired braking torque. When the exhaust gas flows at the desired volume flow rate, a desired back pressure may be accrued in the exhaust pipe to generate the desired braking torque. The volume flow rate may be proportionally related to a back pressure accrued in the exhaust pipe.

The volume flow rate determination module 45 may include an algorithm or a lookup table to determine the desired volume flow rate. The volume flow rate can be calculated based on mass air flow measured by the MAF sensor 34 and an exhaust temperature measured by the temperature sensor 38. When the desired volume flow rate is determined, a signal is sent to the VGT control module 48. The VGT control module 48 determines a position of the VGT vanes corresponding to the desired volume flow rate and controls the position of the VGT 28 accordingly. When the VGT 28 is set at the position (i.e., a first position), back pressure can be built in the exhaust pipe 22 to apply the desired braking torque to the engine 12.

During engine braking, the exhaust temperature may be changed due to a changed operating condition. For example only, the exhaust temperature may be significantly increased due to diesel particulate filter (DPF) regeneration. The exhaust temperature may be decreased due to a near zero fueling. Further, the exhaust temperature may be changed due to the restricted exhaust flow. The increased/decreased exhaust temperature affects the actual braking torque applied to the engine. Therefore, the VGT position needs to be adjusted to maintain the desired braking torque.

For example only, when a desired braking torque for a particular engine speed is 200 Nm, the desired volume flow rate corresponding to the desired braking torque is 1500 mm$^3$/stroke. The VGT may be operated to a first position (for example only, 98% VNT position) to provide the desired volume flow rate to build the desired back pressure in the exhaust manifold. After the braking torque is applied, an increased/decreased exhaust temperature due to a changed operating condition changes the actual pressure and, consequently, the actual braking torque applied to the engine. Back pressure may be proportionally related to volume flow rate.

To ensure the actual braking torque matches the desired braking torque at the particular engine speed, the volume flow rate needs to be changed to, for example only, 2000 mm$^3$/stroke to change the back pressure at the increased/decreased exhaust temperature.

The adjustment module 46 communicates with the temperature sensor 38 and determines an adjusted volume flow rate for the increased/decreased exhaust temperature. The adjustment module 46 may include a table that provides correlations between exhaust temperatures and perspective volume flow rates of the exhaust gas. Therefore, the adjusted volume flow rate is determined based on the desired volume flow rate, a first exhaust temperature, and a second exhaust temperature. The first exhaust temperature is the temperature when the desired volume flow rate is determined. The second exhaust temperature is the temperature when the adjustment module 46 determines the adjusted volume flow rate. The adjustment module 46 may make the adjustment after the adjustment module 46 determines that an increase/decrease in the exhaust temperature exceeds a threshold and that adjustment is necessary.

After the adjustment module 46 determines the adjusted volume flow rate, the adjustment module 46 sends a signal to the VGT control module 48 to adjust the position of the VGT 28. The VGT control module 48 may be calibrated to determine the vane position set points. The VGT control module 48 then controls the VGT 28 to a second position to allow the exhaust gas to flow through the VGT 28 at the adjusted volume flow rate. Therefore, the actual braking torque can match desired braking torque despite the increased/decreased exhaust temperature due to a changed operation condition.

While the temperature sensor 38 is illustrated to be provided at the DPF 26 in FIG. 1, it is understood that the temperature sensor 38 may be provided at other locations in the exhaust system 18, including, but not limited to, the DOC 24 and VGT 28.

After the desired braking torque is applied, the engine speed is reduced. The braking torque estimation module 44 continuously receives signals from the engine speed sensor 36 and estimates a desired braking torque for a reduced engine speed at a first time interval. The VGT control module 48 changes the position of the VGT 28 in response to a change in the desired braking torque. Concurrently, the adjustment module 46 makes an adjustment to the desired volume flow rate in response to a change in the exhaust temperature to ensure that the actual braking torque matches the desired braking torque at the reduced engine speed. The temperature sensor 38 may provide the temperature feedback to the adjustment module at a second interval, for example only, every 20 msec.

Figure 3:
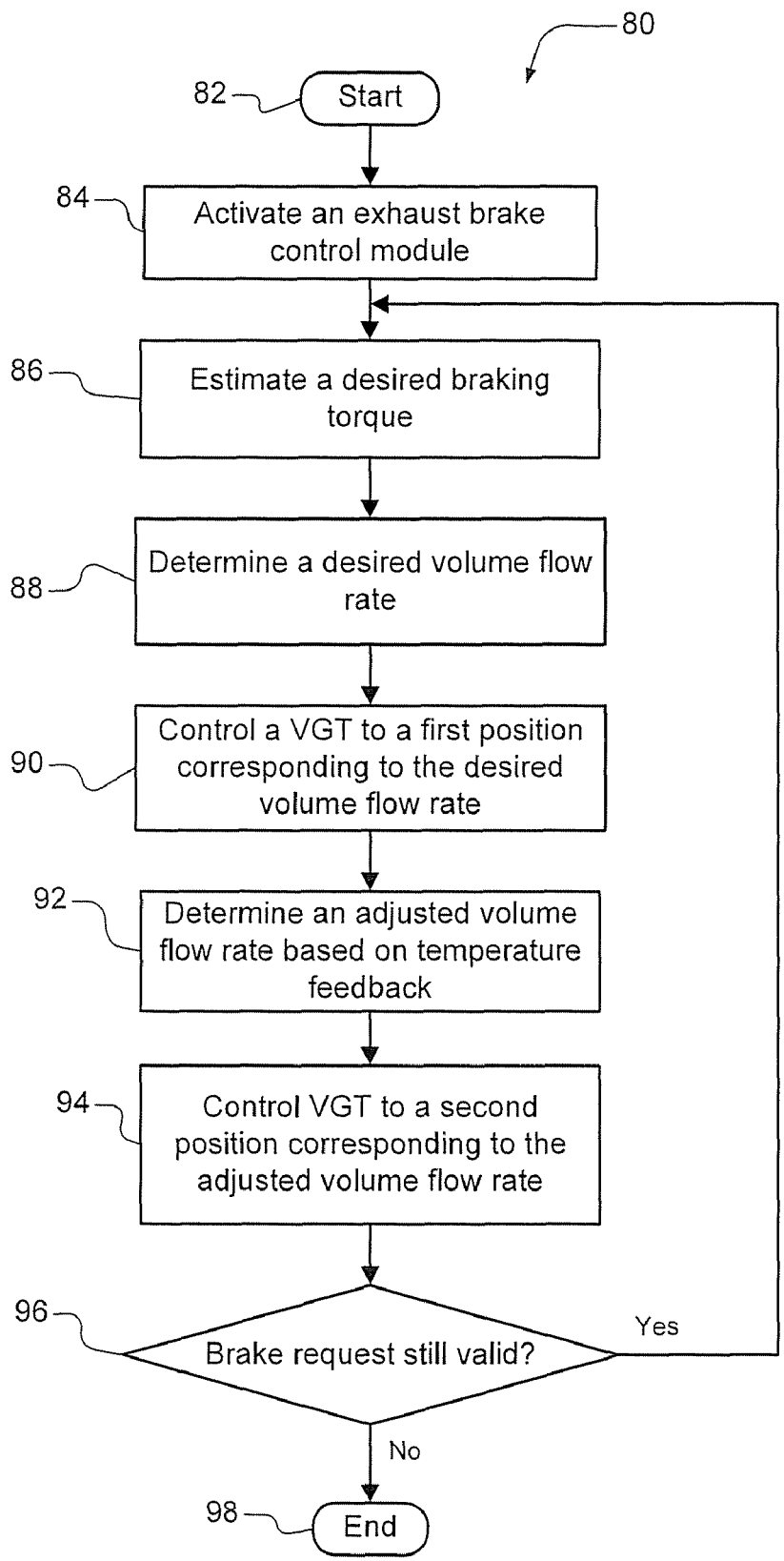
FIG. 3 is a flow diagram of a method of operating an exhaust brake in accordance with the teachings of the present disclosure.

Referring to FIG. 3, a method 80 of operating an exhaust brake starts in step 82. When the control module 30 receives a brake request 52 (for example, when a brake pedal 50 is depressed), the exhaust brake control module 42 is activated in step 84. The braking torque estimation module 44 estimates a desired braking torque based on an engine speed in step 86. The volume flow rate determination module 45 determines a desired volume flow rate based on the estimated braking torque in step 88. The VGT control module 48 operates the VGT 28 to a first position based on the desired volume flow rate in step 90. The adjustment module 46 determines an adjusted volume flow rate based on the exhaust temperature in step 92. The VGT control module 48 operates the VGT 28 to a second position to provide the adjusted volume flow rate in step 94. After the braking, if the brake request 52 is still valid in step 96, steps 86 to 96 are repeated. If the brake request 52 is no longer valid, the method 80 ends in step 98.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. An exhaust brake control system comprising:
 a braking torque estimation module that estimates a desired braking torque based on engine speed;
 a volume flow rate determination module that determines a desired volume flow rate of an exhaust gas based on the desired braking torque; and
 an adjustment module that adjusts an actual volume flow rate to control actual braking torque based on the desired braking torque and a change in exhaust temperature.

2. The exhaust brake control system of claim 1 wherein the adjustment module adjusts the actual volume flow rate further based on at least one of a DPF regeneration mode and a near zero fueling condition.

3. The exhaust brake control system of claim 1 further comprising a control module that adjusts a flow restriction device based on the desired volume flow rate at a first exhaust temperature and based on an adjusted volume flow rate at a second exhaust temperature.

4. The exhaust brake control system of claim 3 wherein the adjusted volume flow rate is determined based on the desired volume flow rate, the first exhaust temperature, and the second exhaust temperature.

5. The exhaust brake control system of claim 3 wherein the volume flow rate determination module determines the desired volume flow rate based on the desired braking torque and the first exhaust temperature.

6. The exhaust brake control system of claim 5 wherein the adjustment module determines the adjusted volume flow rate when the exhaust gas is at the second exhaust temperature.

7. The exhaust brake control system of claim 1 further comprising a temperature sensor that outputs a signal to the adjustment module at a first predetermined interval.

8. The exhaust brake control system of claim 7 wherein the temperature sensor is provided at one of a diesel particulate filter (DPF), a diesel oxidation catalyst (DOC), a turbine of a turbocharger, and an inlet of a flow restriction device.

9. A method of operating an exhaust brake comprising:
 estimating a desired braking torque based on engine speed;
 determining a desired volume flow rate of an exhaust gas based on the desired braking torque; and
 adjusting an actual volume flow rate to control actual braking torque based on the desired braking torque and a change in exhaust temperature.

10. The method of claim 9 further comprising adjusting the actual volume flow rate further based on at least one of a DPF regeneration and a near zero fueling condition.

11. The method of claim 9 further comprising adjusting the desired volume flow rate based on the desired volume flow rate, a first exhaust temperature, and a second exhaust temperature.

12. The method of claim 11 further comprising determining the desired volume flow rate based on the braking torque and the first exhaust temperature.

13. The method of claim 11 further comprising operating a flow restriction device based on the desired volume flow rate at the first exhaust temperature and operating the flow restriction device based on the adjusted volume flow rate at the second exhaust temperature.

14. The method of claim 9 further comprising providing a temperature sensor that outputs a signal at a first predetermined interval.

15. The method of claim 14 wherein the temperature sensor is provided at one of a diesel particulate filter (DPF), a diesel oxidation catalyst (DOC), a turbine of a turbocharger, and an inlet of a flow restriction device.

* * * * *